United States Patent
Carroll et al.

(10) Patent No.: US 7,499,530 B2
(45) Date of Patent: Mar. 3, 2009

(54) SYSTEM AND METHOD FOR ON-DEMAND RECORDING

(75) Inventors: Robert Carroll, Allen, TX (US); Darrell Roberts, Flower Mound, TX (US); Theodore Edwards, Plano, TX (US)

(73) Assignee: Telstrat Int'l, Ltd, Plano, TX (US)

( * ) Notice: Subject to any disclaimer, the term of this patent is extended or adjusted under 35 U.S.C. 154(b) by 0 days.

(21) Appl. No.: 10/146,168

(22) Filed: May 15, 2002

(65) Prior Publication Data

US 2002/0172332 A1 Nov. 21, 2002

Related U.S. Application Data

(60) Provisional application No. 60/291,878, filed on May 18, 2001.

(51) Int. Cl.
*H04M 1/64* (2006.01)
(52) U.S. Cl. .................. 379/88.25; 379/88.17
(58) Field of Classification Search ........... 379/67.1, 379/68, 88.01, 88.22, 88.23, 88.25, 88.24, 379/309
See application file for complete search history.

(56) References Cited

U.S. PATENT DOCUMENTS

| | | | | |
|---|---|---|---|---|
| 2,340,160 A * | 1/1944 | Van Deventer | ............... | 379/84 |
| 4,851,937 A * | 7/1989 | Sander | ............... | 360/69 |
| 4,891,835 A * | 1/1990 | Leung et al. | ............. | 379/88.11 |
| 5,046,079 A * | 9/1991 | Hashimoto | ............... | 348/14.06 |
| 5,333,103 A | 7/1994 | Cvek | | |
| 5,345,430 A * | 9/1994 | Moe | ............... | 369/7 |
| 5,535,256 A * | 7/1996 | Maloney et al. | ............. | 379/309 |
| 5,535,261 A | 7/1996 | Brown et al. | | |
| 5,535,262 A * | 7/1996 | Kanzawa | ............... | 379/88.25 |
| 5,544,231 A * | 8/1996 | Cho | ............... | 379/88.24 |
| 5,819,005 A * | 10/1998 | Daly et al. | ............... | 704/200 |
| 6,029,063 A | 2/2000 | Parvulescu et al. | | |
| 6,072,645 A * | 6/2000 | Sprague | ............... | 360/5 |
| RE36,801 E * | 8/2000 | Logan et al. | ............... | 348/571 |
| 6,122,665 A * | 9/2000 | Bar et al. | ............... | 709/224 |
| 6,209,025 B1* | 3/2001 | Bellamy | ............... | 709/217 |
| 6,222,909 B1* | 4/2001 | Qua et al. | ............... | 379/88.22 |
| 6,233,320 B1 | 5/2001 | Haimi-Cohen | | |
| 6,233,389 B1* | 5/2001 | Barton et al. | ............... | 386/46 |
| 6,263,147 B1* | 7/2001 | Tognazzini | ............... | 386/46 |
| 6,269,361 B1* | 7/2001 | Davis et al. | ............... | 707/3 |
| 6,363,440 B1* | 3/2002 | Stepp et al. | ............... | 710/52 |
| 6,445,694 B1 | 9/2002 | Swartz | | |

(Continued)

FOREIGN PATENT DOCUMENTS

WO WO 9839901 A1 * 9/1998

*Primary Examiner*—Curtis Kuntz
*Assistant Examiner*—Joseph T Phan
(74) *Attorney, Agent, or Firm*—Schwegman, Lundberg & Woessner, P.A.

(57) ABSTRACT

Disclosed is a system and method for on-demand recording of telephone, computer, or video signals. Once a connection is established, the communication signals are sent through an intermediary device, which duplicates the signals. The signals are then stored in memory until a triggering event occurs during the connection. If the triggering event occurs, then the signals in memory are stored for playback. If the triggering event does not occur prior to the termination of the connection, the signals in memory are erased.

5 Claims, 5 Drawing Sheets

U.S. PATENT DOCUMENTS

| | | | |
|---|---|---|---|
| 6,542,602 B1 * | 4/2003 | Elazar | 379/265.06 |
| 6,661,879 B1 * | 12/2003 | Schwartz et al. | 379/88.25 |
| 6,665,376 B1 * | 12/2003 | Brown | 379/85 |
| 6,668,044 B1 * | 12/2003 | Schwartz et al. | 379/68 |
| 6,757,906 B1 * | 6/2004 | Look et al. | 725/45 |
| 6,766,000 B2 * | 7/2004 | Squibbs et al. | 379/88.23 |
| 6,778,639 B2 | 8/2004 | Gusler et al. | |
| 6,850,691 B1 * | 2/2005 | Stam et al. | 386/68 |
| 7,054,420 B2 | 5/2006 | Barker et al. | |
| 7,149,415 B2 * | 12/2006 | Thiagarajan et al. | 386/113 |
| 2001/0051037 A1 * | 12/2001 | Safadi et al. | 386/83 |
| 2002/0040475 A1 * | 4/2002 | Yap et al. | 725/39 |
| 2002/0067810 A1 * | 6/2002 | Barak et al. | 379/88.25 |
| 2002/0114613 A1 * | 8/2002 | Thai | 386/52 |
| 2003/0223552 A1 | 12/2003 | Schoeman | |
| 2004/0047451 A1 * | 3/2004 | Barker et al. | 379/67.1 |
| 2006/0233321 A1 | 10/2006 | Barker et al. | |

* cited by examiner

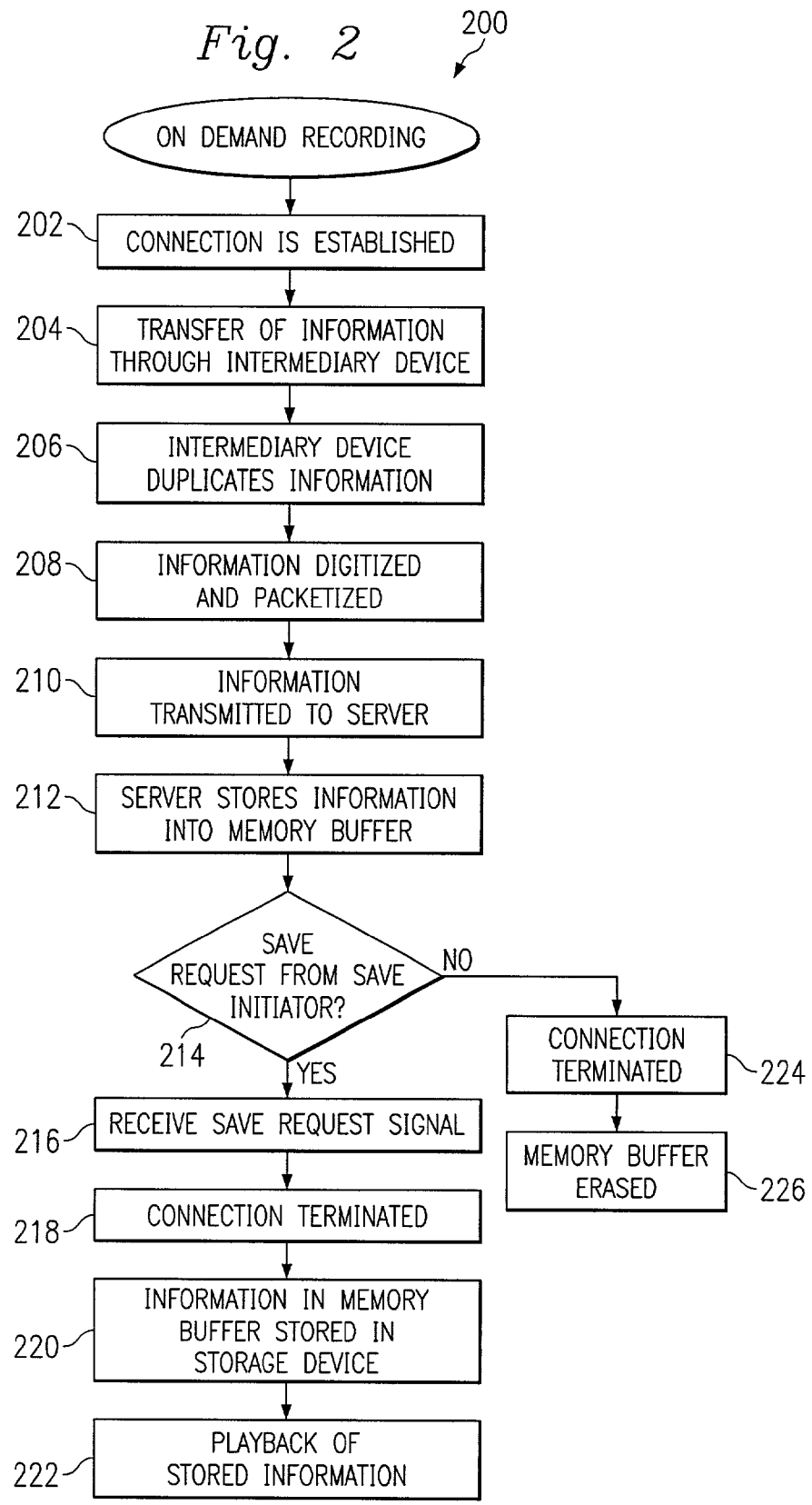

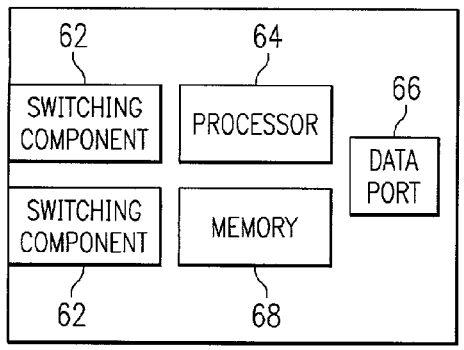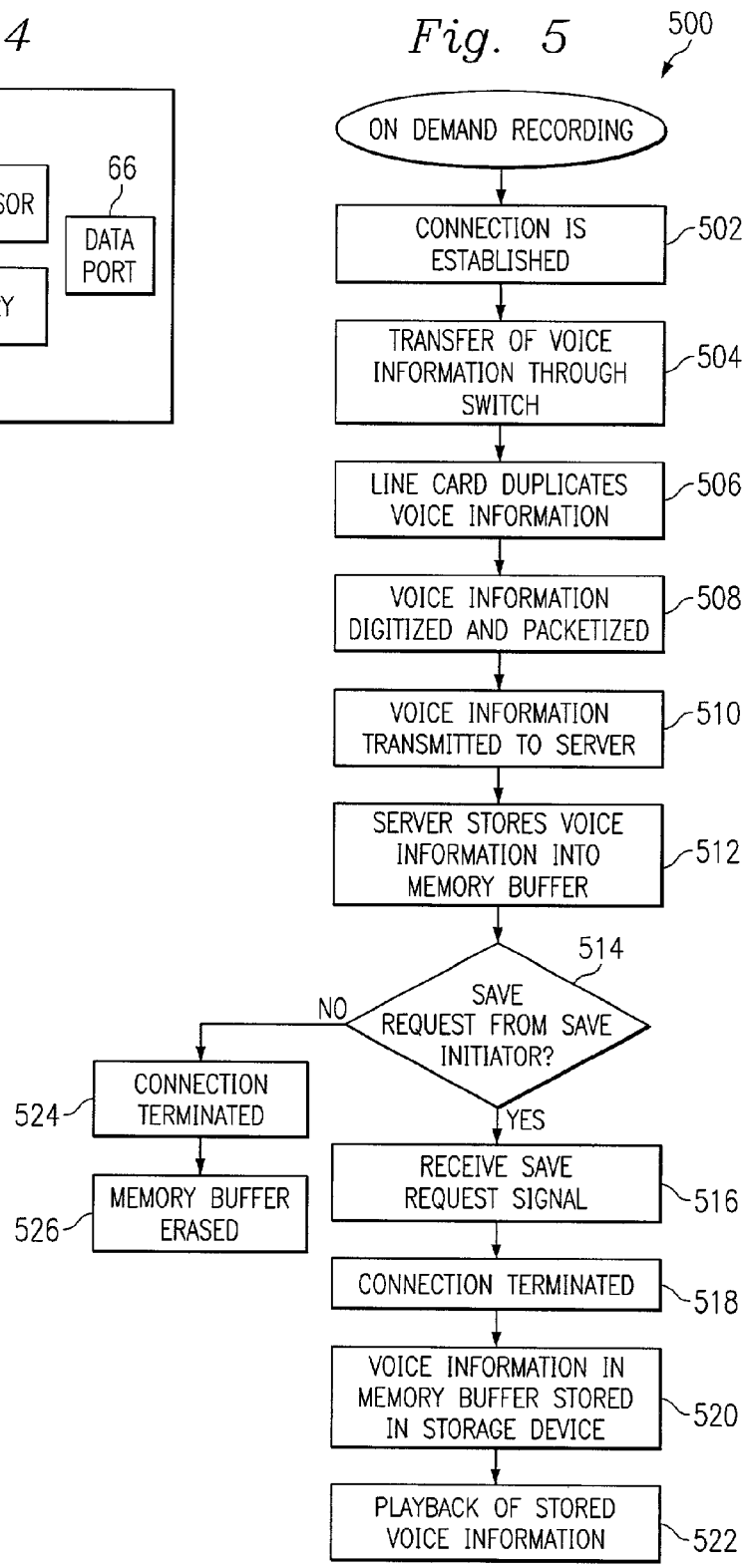

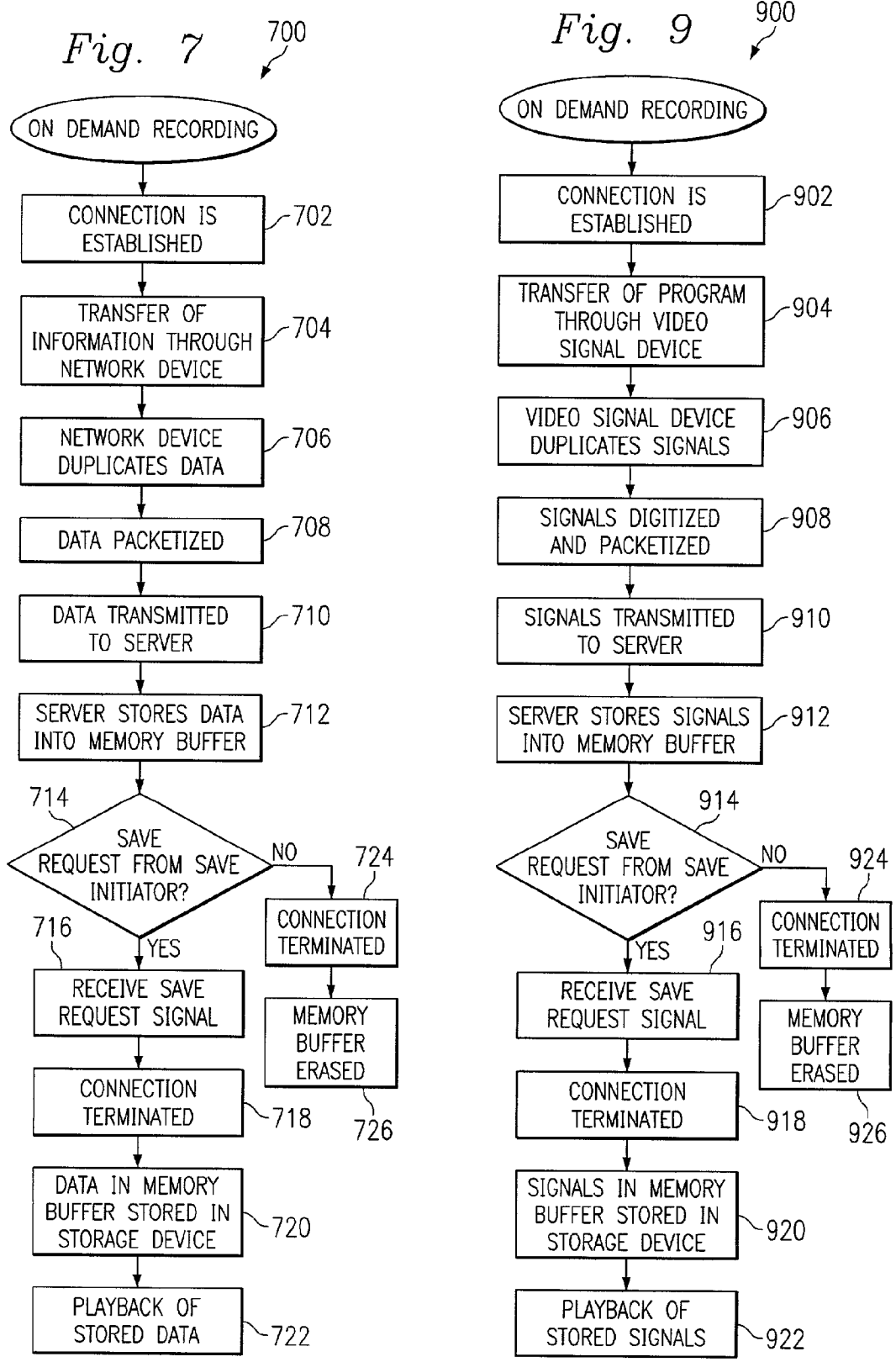

SYSTEM AND METHOD FOR ON-DEMAND RECORDING

RELATED PROVISIONAL PATENT APPLICATION

This application claims priority to U.S. Provisional Patent Application Ser. No. 60/291,878 filed May 18, 2001.

BACKGROUND OF THE INVENTION

1. Field of the Invention

The present invention relates to a recording device for recording a stream of analog or digital data.

2. Description of the Prior Art

In the current state of the industry, in order to record the contents of a telephone call, computer transmission, television program, or any form or type of analog or digital data transmission, there are two basic methods. The first method is "logging," which consists of recording every transmission, from initiation until termination, regardless of the content or characteristics of the transmission. Because logging is independent of the contents and characteristics of the transmission, if a specific transmission is to be reviewed, it becomes necessary to record every transmission. Recording every transmission, however, requires a significant amount of storage space. Further, because of the number of transmissions recorded, it is difficult and time-consuming to locate a specific transmission.

The second method of recording a transmission is "event driven" recording, which records a transmission upon the occurrence of a certain condition or event. In some instances, the recording condition may be the start of the transmission (which is, in effect, the logging method), while in other instances the event will occur during the transmission (such as when a user presses a "record" button during the transmission). Other events may be time-based, such as when recording begins and ends at a specific times. One difficulty of an event driven recording system is properly defining the event that initiates recording. An overly broad event may record too many transmissions, while too specific of an event may not record enough. Another disadvantage of event driven recording is that the event may not occur, or may occur at the wrong time, resulting in not all of the content of the transmission being recorded. Yet another disadvantage is that if the event cannot (or does not) occur until after the initiation of transmission, then the transmission that occurs prior to the event is not recorded. Further, for communications via computer instant messenging, a similar disadvantage occurs when the content of the conversation may "scroll off" the screen before the user can save the earlier portions of the conversation.

SUMMARY OF THE INVENTION

The present invention provides a new and unique system and method for on-demand recording of analog and digital information. In one embodiment, a connection is established on a communication device with an intermediary device. The information transmitted via the connection is dynamically stored. If a triggering event occurs during the connection, the information of the entire connection is saved at the conclusion of the connection, thus allowing the information to be replayed on-demand.

In another embodiment, a telephone call is established on a telephone with a PBX including a plurality of line cards. The voice information of the telephone call is duplicated dynamically at one of the line cards. The voice information can then be digitized and packetized. The voice information is output to a server connected to the PBX. During the telephone call a triggering event is activated, and the voice information of the entire telephone call is saved on the server at the conclusion of the telephone call, thus allowing the information to be replayed on-demand.

In a further embodiment, a computer data connection is established on a computer with a network device. The computer data is duplicated dynamically by the network device and packetized. The computer data is output to a server connected to the network device. During the computer data connection a triggering event is activated, and the computer data of the entire connection is saved on the server at the conclusion of the connection, thus allowing the computer data to be replayed on-demand.

In yet another embodiment, a television transmission is established on a display device with a video signal device. The television program is duplicated dynamically by the video signal device. The television program can then be digitized and packetized. The television program is output to a server connected to the video signal device. During the television transmission a triggering event is activated, and the television program of the entire television transmission is saved on the server at the conclusion of the television transmission, thus allowing the information to be replayed on-demand.

BRIEF DESCRIPTION OF THE DRAWINGS

FIG. 2 is a flowchart illustrating the operation of an embodiment of the invention.

FIG. 4 is an illustration of a line card, such as can be used in the voice implementation of FIG. 3.

FIG. 5 is a flowchart illustrating the operation of the voice implementation.

FIG. 7 is a flowchart illustrating the operation of the computer network implementation of FIG. 6.

FIG. 9 is a flowchart illustrating the operation of the television network implementation of FIG. 8.

DETAILED DESCRIPTION

The following disclosure provides many different embodiments, or examples, for implementing different features of an on-demand recording system. Specific examples of components, processes, and implementations are described to help clarify the invention. These are, of course, merely examples and are not intended to limit the invention from that described in the claims.

Figure 1:
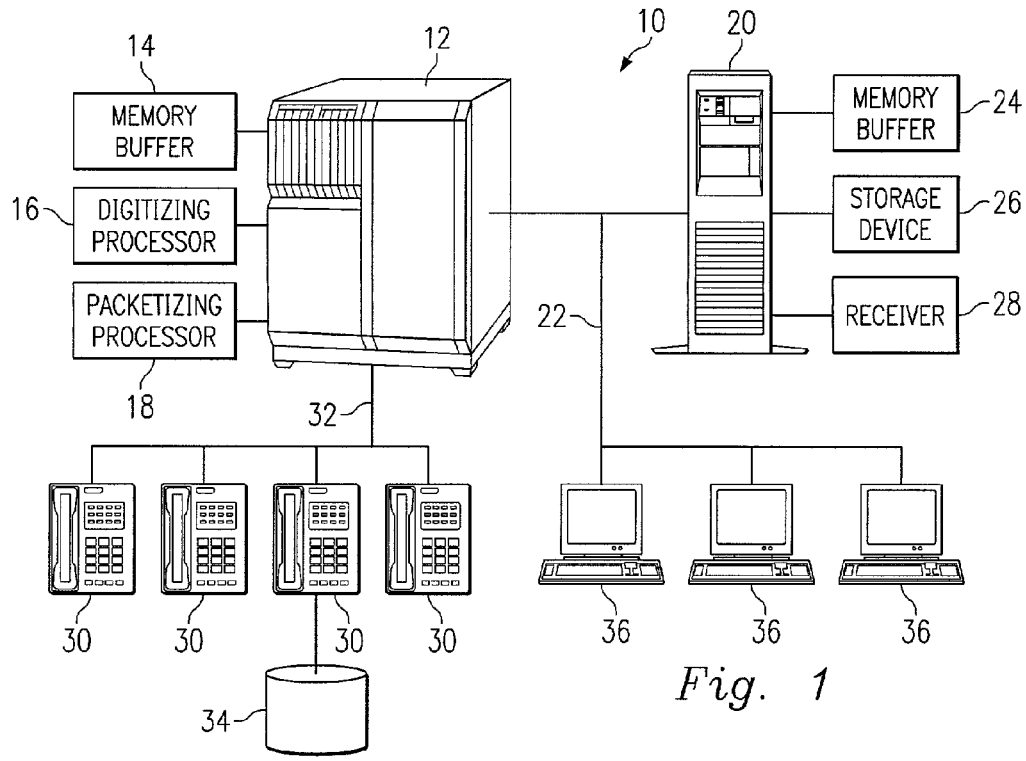
FIG. 1 is an illustration of an embodiment of the invention.

Referring to FIG. 1, one embodiment 10 of an on-demand recording system includes an intermediary device 12 connected to a server 20 via a network 22. The intermediary device 12 includes a memory buffer 14, such as RAM or a hard drive, a processor 16 for converting analog signals into digital signals, and a processor 18 for placing data into packets. While processor 16 and processor 18 are depicted as separate processors, it is contemplated that a single processing system, composed of one or more processors in conjunction with firmware or software, could provide equivalent functionality. The server 20 includes a memory buffer 24, such as random access memory (RAM) or a hard drive, a storage device 26, such as a compact disk (CD-ROM) drive, floppy drive, or hard drive, and a device 28 for receiving a save initiation request. The intermediary device 12 is connected to one or more communication devices 30 via a network 32. Communication devices 30 may be capable of transmitting or receiving analog or digital signals via the network 32. Also connected to network 22 are one or more playback devices 36, such as computers, dumb terminals, televisions, telephones, or other communication devices. Network 22 and network 32 may be any type of wired or wireless system for transmission of signals, including, a plain old telephone switch (POTS) network, computer packet network, or television broadcast system.

Connected to at least one of the communication devices 30 is a save initiator 34, which allows a user of the on-demand recording system 10 to initiate a save request. While depicted in FIG. 1 as being connected to one of the communication devices 30, the save initiator 34 may instead (or in addition) be connected to any of the other components or may be a stand-alone component connected to network 22 or network 32, thus allowing the initiation of the save request by someone other than a user of the communication devices 30. Further, the save initiator 34 may be a touch pad, button, icon on a display screen, or any means or physical device to generate a save request signal.

Referring now to FIG. 2, in one embodiment, the on-demand recording system 10 may perform an on-demand recording method 200. At step 202, a connection is established between two communication devices (e.g., the communication devices 30 of FIG. 1 or an external communication device that is not part of the on-demand recording system). Examples of the connection include a telephone call, a data transmission between computers, a reception of a television signal, or any connection involving the transmission of information or data. In the present example, the connection is made through the intermediary device 12 of FIG. 1. At step 204, once the connection is established, the intermediary device transmits the information to and from the communication devices. At step 206, the information is dynamically duplicated into the memory buffer 14 as the information is communicated through the connection.

In one embodiment, the duplicated information is digitized at step 208 by the processor 16 (if not already in digital form). The digitized information can also be placed into packets. It is understood that in some embodiments, the step of digitizing the information could occur prior to duplication and packetization. At step 210, the packets are then provided over the network 22 and received by the server 20. At step 212, the server 20 extracts (e.g., de-packetizes) the digitized information from the packets and stores the extracted information in the memory buffer 24. While packets are used in the preferred embodiment, other forms of data transfer are commonly used by those skilled in the art, including, for example, frames, raw data, or tokens.

At any time during the connection, up until the connection is terminated, a user of the on-demand recording system 10 may request that the information of the entire connection be saved for later retrieval by initiating a save request with the save initiator 34 (a triggering event), such as at step 214. It should be noted, however, that the user of the on-demand system 10 does not necessarily have to be a user of a communication device 30. If a save request signal is initiated at step 214, execution proceeds to step 216 where the save initiator 34 transmits a save request signal for receipt by the receiver 28. At step 218, the connection is terminated (in some embodiments), and at step 220, the contents of the memory buffer 24 on the server 20 is copied onto the storage device 26. At step 222, the saved information of the entire connection on storage device 26 is made available for playback via the playback device 36. In this manner, regardless of when the save request is initiated during the connection, the entire connection is available for playback.

In the present embodiment, if the connection terminates without a save request signal, such as at step 224, execution proceeds to step 226, where the contents of the memory buffer 24 on the server 20 is erased.

Figure 3:
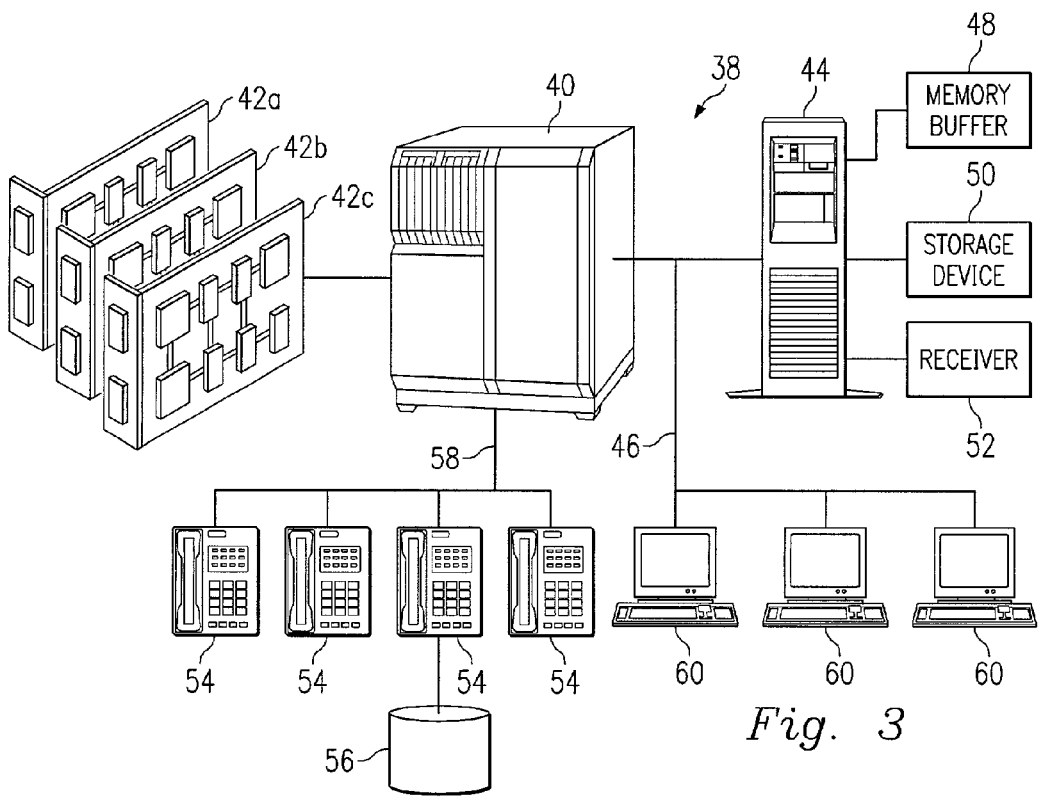
FIG. 3 is an illustration of a voice implementation of the invention.

Referring now to FIG. 3, another embodiment of an on-demand recording system for use with voice communications is designated with the reference numeral 38. The on-demand system 38 utilizes a switch 40, which includes a series of line cards 42. The switch 40 is connected to a server 44 via a network 46. The server 44 includes a memory buffer 48, storage device 50, and a device 52 for receiving a save initiation request. The line cards 42 are connected to communication devices 54 via a network 58. It is understood that communication device 54, such as a telephone or any telephony device, may be capable of transmitting analog or digital signals, and that switch 40 may be any type of switch, such as an exchanger switch, telephone switch, or a private branch exchange (PBX). Any number of telephones 54 may be connected to any number of line cards 42. Also connected to the network 46 are one or more playback devices 60 for playing back recorded communications.

In the present embodiment, a save initiator 56 is connected to a single telephone 54. While depicted in FIG. 3 as being connected to a telephone 54, the save initiator may instead (or in addition) be connected to any of the other components or may be a stand-alone component connected to network 46 or network 58, thus allowing the initiation of the save request by someone other than a user of the telephone 54. Further, the save initiator 56 may be a touch pad, button, icon on a display screen, or any means or physical device to generate a save request signal.

Referring to FIG. 4, for the sake of example, each of the line cards 42 is constructed similar to a line card 42a. The line card 42a includes a plurality of conventional switching components 62 and a processor 64 that is capable of digitizing, duplicating, and/or packetizing information for transmission. The line card 42a also includes a data port 66 for transferring information onto either network 58 or network 46 or both. The processor 64 may be connected to a power supply (not shown) of the line card 42a. The line card will also include a memory 68 for storing signals that are switched through the line card.

Referring now to FIG. 5, in one embodiment, the on-demand recording system 38 may perform an on-demand recording method 500. At step 502, a connection is established between two telephones (e.g., the telephones 54 of FIG. 3, or any telephony device or an external communication device that is not part of the on-demand recording system). In the present example, the connection is a telephone call transmitting voice information. At step 504, the connection is sent through a line card 42a in the PBX 40 and the line card 42a will transmit the voice communication to and from the telephones 54. At step 506, the processor 64 will dynamically duplicate the communications into memory 68 as the voice communication is transmitted via the telephone call. At step 508, the duplicated communications, if not already in digital form, are digitized by the processor 64, and then the digitized communications will be placed into packets. It is understood that digitizing the communications could occur prior to duplication and packetization.

At step 510, the packets are output over the network 46 and received by the server 44. At step 512, the server 44 will extract (e.g., de-packetize) the digitized communications from the packets and store the communications in a memory buffer 48. While packets are used in the preferred embodiment, other forms of data transfer are commonly used by those skilled in the art, including, for example, frames, raw data, or tokens.

At any time during the connection, up until the connection is terminated, the user of the voice implementation of the on-demand recording system 38 may request that the information of the entire connection be saved for later retrieval by initiating a save request (a triggering event), such as at step 514. It should be noted, however, that the user of the on-demand system does not necessarily have to be a user of a telephone 54. If a save request signal is initiated at step 514, execution proceeds to step 516, where the save initiator 56 will transmit a save request signal, which will be received by the receiver 52. At step 518, the telephone call is terminated and execution continues to step 520, where, the memory buffer 48 on the server 44 is copied onto the storage device 50. At step 522, the entire saved communication is available for playback via a playback device 60. In this manner, regardless of when the save request is initiated during the connection, the entire communication of the connection is available for playback.

If the telephone call terminates without a save request signal, such as at step 524, execution proceeds to step 526, where the memory buffer 48 on the server 44 is erased.

Figure 6:
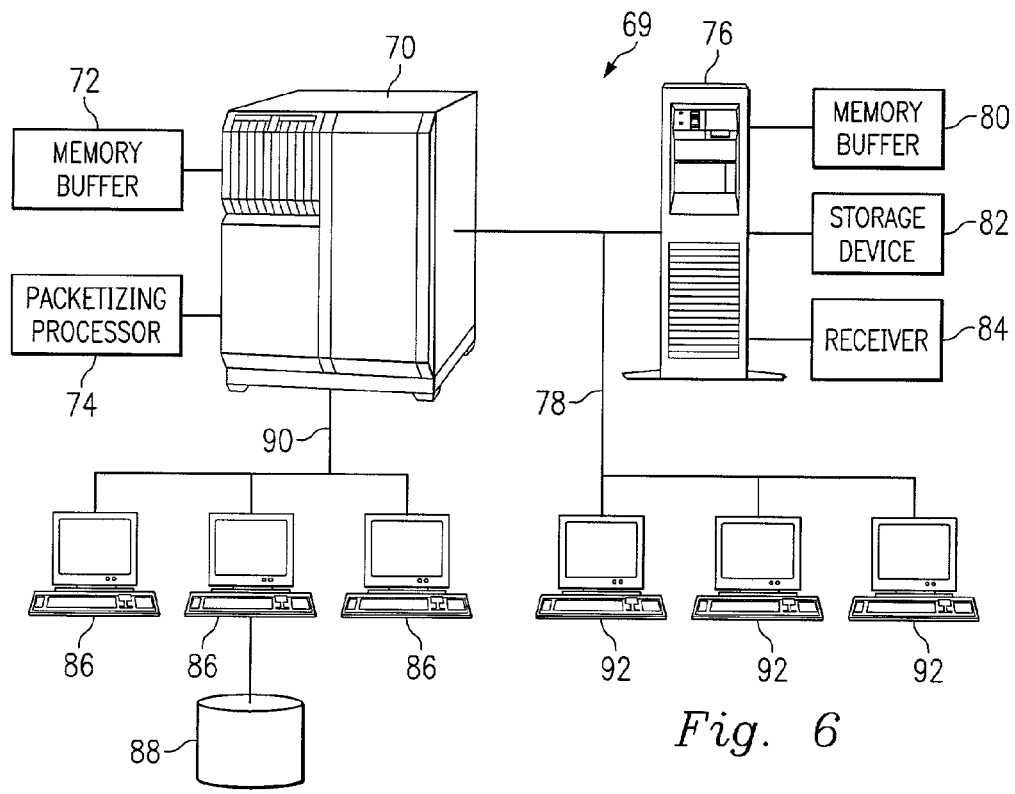
FIG. 6 is an illustration of another embodiment of the invention implemented in a computer network.

Referring now to FIG. 6, an embodiment of an on-demand recording system for use with computer communications is designated with the reference numeral 69. A network device 70 is connected to a server 76 via a network 78. The network device 70 includes a memory buffer 72 and a processor 74 for placing data into packets. The server 76 includes a memory buffer 80, a storage device 82, and a device 84 for receiving a save initiation request. The network device 70 is also connected to computers 86 via a network 90, and one or more playback devices 92 are connected to the server 76 by network 78.

Network 78 and network 90 may be capable of transmitting analog or digital signals, and may be any type of computer or telecommunication network. The network device 70 may be a router, hub, personal computer, server, gateway, bridge, or any device capable of facilitating network communications, and any number of computers 86 may be connected to any number of network devices 70.

The computers 86 may be personal computers, personal digital assistants, or any device capable of receiving and/or transmitting signals. The computers 86 may also be running voice over IP software or software that allows computer messenging communications, such as provided by America Online's Instant Messenger, Yahoo! Messenger, or MSN Messenger. A save initiator 88 is connected to a computer 86. While depicted in FIG. 6 as being connected to one of the computers 86, the save initiator 88 may instead (or in addition) be connected to any of the other components or may be a stand-alone component connected to network 78 or 90, thus allowing the initiation of the save request by someone other than a user of a computer 86. It is further understood that while network 78 and network 90 are depicted as distinct networks, that network 78 and network 90 could be the same network.

Referring now to FIG. 7, in one embodiment, the on-demand recording system 69 may perform an on-demand recording method 700. At step 702, a connection is established between two computers (e.g., the computers 86 of FIG. 6 or an external communication device that is not part of the on-demand recording system). Examples of the connection include a telephone call, a data transmission between computers, a reception of a television signal, or any connection involving the transmission of information or data. In the present example, the data is sent through the network device 70 of FIG. 1. At step 704, once the connection is established, the network device transfers information to and from the computers. At step 706, the data is dynamically duplicated into memory 72 as the telephone call is communicated through the connection.

At step 708, the duplicated data is placed into packets for transmission across a packet network. At step 710, the packets are output over the network 78 to the server 76. At step 712, the server 76 will extract (e.g., de-packetize) the data from the packets and store the data in the memory buffer 80. While packets are used in the preferred embodiment, other forms of data transfer are commonly used by those skilled in the art, including, for example, frames, raw data, or tokens.

At any time during the connection, up until the connection is terminated, the user of the on-demand recording system 69 may request that the data be saved for later retrieval (a triggering event), such as at step 714. It should be noted, however, that the user of the on-demand recording system 69 does not necessarily have to be a user of a computer 86. If a save request signal is initiated at step 714, execution proceeds to step 716, where the save initiator 88 will transmit a save request signal, which will be received by the receiver 84. At step 718, the connection is terminated, and execution continues to step 720, where the memory buffer 80 on the server 76 is copied onto the storage device 82. At step 722, the entire saved communication on storage device 82 is available for playback via a playback device 92. In this manner, regardless of when the save request is initiated during the connection, the entire communication is available for playback.

If the connection terminates without a save request signal being received at the receiver 84, such as at step 724, execution proceeds to step 726, where the memory buffer 80 on the server 76 is erased.

Figure 8:
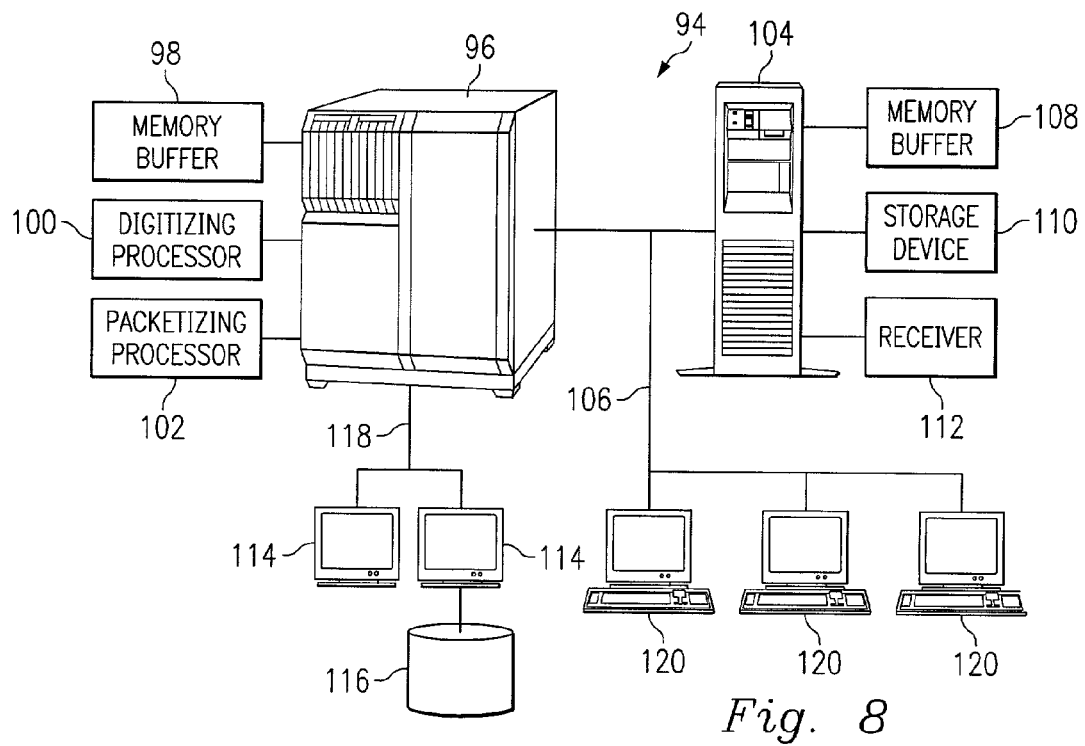
FIG. 8 is an illustration of a television network implementation of the invention.

Referring now to FIG. 8, an embodiment of an on-demand recording system for use with television programs is designated by reference numeral 94. A video signal device 96 for receiving video signals is connected to a server 104 via a network 106. The video signal device includes a memory buffer 98, a processor 100 for digitizing video signals, and a processor 102 for packetizing video signals. While processor 100 and processor 102 are depicted as separate processors, it is contemplated that a single processing system, composed of one or more processors in conjunction with firmware or software, could provide equivalent functionality. The video signal device 96 may be a computer, storage device, tuner, or any device capable of receiving video signals, including TiVo, Inc.'s digital video recorder or Microsoft Corporation's UltimateTV digital video recorder.

The server 104 includes a memory buffer 108, a storage device 110, and a receiver 112 for receiving save request signals, and one or more playback devices 120 are connected to server 104 by network 106. Network 106 and network 118 may be capable of transmitting analog or digital signals, and may be any type of computer, telecommunication, or television transmission network, whether cable, broadcast, or satellite. It is also understood that while network 106 and network 118 are depicted as distinct networks, that network 106 and network 118 could be the same network.

At least one display device 114 is connected to the video signal device 96 via a network 118, and any number of display devices 114 may be connected to any number of video signal devices 96. The display devices 114 may be computers, personal digital assistants, televisions, or any device capable of receiving and/or transmitting signals. Connected to at least one display device 114 is a save initiator 116 for initiating a save request signal. While depicted in FIG. 8 as being connected to one of the display devices 114, the save initiator 116 may be connected to any of the other components or may be a standalone component connected to network 106 or 118, thus allowing the initiation of a save request by someone other than a user of the display device 114. The save initiator 116 may be a touch pad, button, icon on a display screen, or any means or physical device to generate a save request signal.

Referring now to FIG. 9, in one embodiment, the on-demand recording system 94 may perform an on-demand recording method 900. At step 902, a connection is established with a television 114. Examples of the connection include a television program broadcast, a pay-per-view program, or any connection involving the transmission of information or data. In the present example, the connection is transmitted to the television 114 through the video signal device 96. At step 904, once the connection is established, the video signal device transmits the information to the television 114. At step 906, the television program will be dynamically duplicated into memory 98 as the program is communicated through the connection.

In one embodiment, the duplicated program is digitized at step 908 by the processor 100 (if the program is not already in digital form), and then the digitized program will be placed into packets by processor 102. It is understood that the digitization could occur prior to the duplication and packetization of the television program. At step 910, the packets are output over the network 106 to the server 104. At step 912, the server 104 will extract (e.g. de-packetize) the television program from the packets and store the data in the memory buffer 108. While packets are used in the preferred embodiment, other forms of data transfer are commonly used by those skilled in the art, including, for example, frames, raw data, or tokens.

At any time during the television program, up until the transmission is terminated, the user of the on-demand recording system 94 may request that the data be saved for later retrieval (a triggering event), such as at step 914. It should be noted, however, that the user of the on-demand system 94 does not necessarily have to be a user of the television 114. If a save request signal is initiated at step 914, execution proceeds to step 916, where the save initiator 116 will transmit a save request signal, which will be received by the receiver 112. At step 918, the connection is terminated, and at step 920, the memory buffer 108 on the server 104 is then copied onto a storage device 110. At step 922, the entire saved television program is available for playback, regardless of when the save request is initiated. In this manner, regardless of when the save request is initiated during the connection, the entire communication is available for playback.

If the television program transmission terminates without a save request signal, such as at step 924, execution proceeds to step 926, where the memory buffer 108 on the server is erased.

The present invention as described above thus provides an improved method for allowing the entire telephone conversation, television broadcast, and other streams of analog or digital data to be recorded when the triggering event to record the data is initiated during the transmission. It is also contemplated by the present invention that various components of the invention could be combined to reduce the number of components. For example, the playback device could be integrated with the server or a communication device, or the playback device, server, and communication device could be integrated into a single unit. Other embodiments include having the playback device be situated on a separate network from the server or communication device. In addition, the processors contemplated in this disclosure could be hardware, software, or any combination thereof. Further, the memory buffer and storage devices could be combined into a single device.

While the invention has been particularly shown and described with reference to the preferred embodiments thereof, it will be understood by those skilled in the art that various changes in form and detail may be made therein without departing from the spirit and scope of the invention, as set forth in the following claims.

What is claimed is:

1. A method for on-demand recording of voice information, the method comprising:
    establishing a call between communication devices within a private branch exchange (PBX) via at least one line card of a plurality of line cards;
    dynamically duplicating information of the call at the at least one of the plurality of line cards;
    digitizing and packetizing the duplicated information for transmission on a network, external to the PBX;
    transmitting the digitized and packetized information to a server adapted to couple to the PBX;
    dynamically storing the transmitted information by a server coupled to the network;
    receiving a triggering event at any time after the dynamically storing call, wherein the triggering event occurs after initiation of dynamically storing; and
    upon receipt of the triggering event and conclusion of the call, saving the digitized and packetized information corresponding to an entirety of the call on the server so that the saved digitized and packetized information can be replayed on-demand.

2. The method of claim 1 wherein the triggering event is initiated from a telephone.

3. The method of claim 2 wherein the triggering event is initiated remotely from the telephone.

4. The method of claim 1 wherein the triggering event is initiated from a network device.

5. The method of claim 1 wherein the triggering event is initiated from a server connected to the private branch exchange (PBX) device.

* * * * *